Aug. 17, 1965 J. SCHALKWIJK ETAL 3,201,518

PARTY LINE

Filed March 23, 1960 9 Sheets-Sheet 1

INVENTORS
JAN SCHALKWIJK
MEINDERT KOEMAN
BY
AGENT

| | | |
|---|---|---|
| $1,p_i \rightarrow A,5\ (\alpha',\bar{\beta})$ | $7,\bar{p}_i \rightarrow 1\ (\bar{\alpha},\bar{\beta})$ | $12,\bar{p}_i \rightarrow C,1\ (\bar{\alpha},\bar{\beta})$ |
| $1,a \rightarrow A,8\ (\alpha'',\bar{\beta})$ | $8,c_i \rightarrow B_i,9\ (\alpha'',\bar{\beta})$ | $12,b \rightarrow C,7\ (\alpha',\bar{\beta})$ |
| $2,p_i,b \rightarrow C,7\ (\alpha',\bar{\beta})$ | $8,b \rightarrow C,1\ (\bar{\alpha},\bar{\beta})$ | $12,p_i,- \rightarrow C,7\ (\alpha',\bar{\beta})$ |
| $2,\bar{p}_i \rightarrow C,1\ (\bar{\alpha},\bar{\beta})$ | $8,- \rightarrow C,1\ (\bar{\alpha},\beta)$ | $13,p_i,a \rightarrow 14\ (\alpha',\beta''_i)$ |
| $2,p_i,- \rightarrow C,7\ (\alpha',\bar{\beta})$ | $9,a \rightarrow 10\ (\alpha'',\beta''_i)$ | $13,p_i,- \rightarrow C,7\ (\alpha',\bar{\beta})$ |
| $3,b \rightarrow C,1\ (\bar{\alpha},\bar{\beta})$ | $9,- \rightarrow C,1\ (\bar{\alpha},\bar{\beta})$ | $13,p_i,b \rightarrow C,7\ (\alpha',\bar{\beta})$ |
| $3,- \rightarrow C,1\ (\bar{\alpha},\bar{\beta})$ | $9,b \rightarrow C,1\ (\bar{\alpha},\bar{\beta})$ | $13,\bar{p}_i \rightarrow C,1\ (\bar{\alpha},\bar{\beta})$ |
| $4,b \rightarrow C,1\ (\bar{\alpha},\bar{\beta})$ | $10,m_c \rightarrow \varepsilon_c,3\ (\alpha'',\beta''_i)$ | $14,p_i,s \rightarrow 4\ (\alpha'',\bar{\beta})$ |
| $4,- \rightarrow C,1\ (\bar{\alpha},\bar{\beta})$ | $10,m_i \rightarrow \varepsilon_i,11\ (\bar{\alpha},\beta''_i)$ | $14,p_i,\bar{s} \rightarrow C,15\ (\alpha'',\beta''_i)$ |
| $5,p_i \rightarrow B_i,6\ (\alpha',\bar{\beta};W)$ | $10,b \rightarrow C,1\ (\bar{\alpha},\bar{\beta})$ | $14,p_i,b \rightarrow C,7\ (\alpha',\bar{\beta})$ |
| $5,\bar{p}_i \rightarrow C,1\ (\bar{\alpha},\bar{\beta})$ | $11,p_i \rightarrow A,12\ (\alpha',\beta''_i)$ | $15,p_i \rightarrow A,5\ (\alpha'',\beta''_i)$ |
| $5,p_i,- \rightarrow C,7\ (\alpha',\bar{\beta})$ | $11,b \rightarrow C,1\ (\bar{\alpha},\bar{\beta})$ | $15,\bar{p}_i \rightarrow C,1\ (\bar{\alpha},\bar{\beta})$ |
| $6,p_i,a \rightarrow 2\ (\alpha',\beta')$ | $11,\bar{p}_i \rightarrow C,1\ (\bar{\alpha},\bar{\beta})$ | $15,p_i,b \rightarrow C,7\ (\alpha',\bar{\beta})$ |
| $6,\bar{p}_i \rightarrow C,1\ (\bar{\alpha},\beta)$ | $11,- \rightarrow C,1\ (\bar{\alpha},\bar{\beta})$ | |
| $6,p_i,- \rightarrow C,7\ (\alpha',\bar{\beta})$ | $12,p_i \rightarrow B_i,13\ (\alpha',\beta''_i;W)$ | |

FIG. 2

FUNCTION DIAGRAM OF CENTRAL CONNECTING CIRCUIT

INVENTORS
JAN SCHALKWIJK
MEINDERT KOEMAN
BY
Frank R. Trifari
AGENT

| | | |
|---|---|---|
| I,A → VIII | V,W → Δ,V | $VIII_i,B_i$ → IV |
| I,ω → a,VII(Λ) | V,ν → IV | $VIII_i,B_j$ → VI |
| II,ν → b,VI | VI,C → I | VIII,ω → VII(Λ) |
| II,C → VII(Λ) | VI,A → VIII | VIII,– → VI |
| III,ν → b,VI | VI,ω → VII(Λ) | IX,$\gamma_i$ → $c_i$,VII(Λ) |
| III,C → VII(Λ) | VII,ν → I | IX,ν → I |
| III,μ → m,III | VII,A → IX(Λ) | $IX_i,B_i$ → V |
| IV,W → Δ,IV | $VII_i,B_i$ → III | $IX_i,B_j$ → VII(Λ) |
| IV,ω → a,II | $VII_i,B_j$ → VII(Λ) | IX,– → VII(Λ) |
| IV,C → I | | |

FIG. 3

FUNCTION DIAGRAM OF INDIVIDUAL CONNECTING CIRCUIT

INVENTORS
JAN SCHALKWIJK
MEINDERT KOEMAN
BY
Frank R. Trifari
AGENT

PARTY LINE

Filed March 23, 1960 9 Sheets-Sheet 4

OPERATING CHARACTERISTICS OF THE TELEPHONE SYSTEM

INVENTORS
JAN SCHALKWIJK
MEINDERT KOEMAN
BY
Frank R. Trifari
AGENT

PARTY LINE

Filed March 23, 1960

9 Sheets-Sheet 5

OPERATING CHARACTERISTICS OF THE TELEPHONE SYSTEM

INVENTORS
JAN SCHALKWIJK
MEINDERT KOEMAN
BY Frank R. Trifari
AGENT

PARTY LINE

Filed March 23, 1960

INVENTORS
JAN SCHALKWIJK
MEINDERT KOEMAN
BY
Frank R. Trifari
AGENT

PARTY LINE

Filed March 23, 1960 9 Sheets-Sheet 7

INVENTORS
JAN SCHALKWIJK
MEINDERT KOEMAN
BY
Frank R. Trifari
AGENT

PARTY LINE

Filed March 23, 1960 9 Sheets-Sheet 8

INVENTORS
JAN SCHALKWIJK
MEINDERT KOEMAN
BY
Frank R. Trifari
AGENT

Aug. 17, 1965 J. SCHALKWIJK ETAL 3,201,518

PARTY LINE

Filed March 23, 1960 9 Sheets-Sheet 9

INDIVIDUAL CONNECTING CIRCUIT

INVENTORS
JAN SCHALKWIJK
MEINDERT KOEMAN
BY
Frank R. Jeifari
AGENT

United States Patent Office 3,201,518
Patented Aug. 17, 1965

3,201,518
PARTY LINE

Jan Schalkwijk and Meindert Koeman, Hilversum, Netherlands, assignors to North American Philips Company, Inc., New York, N.Y., a corporation of Delaware Filed Mar. 23, 1960, Ser. No. 17,056
Claims priority, application Netherlands, Mar. 25, 1959, 237,528
7 Claims. (Cl. 179—17)

This invention relates to a party line which is connected by means of a central connecting circuit COV to an automatic or non-automatic telephone exchange C*tr* and which is connected via individual circuits IOV to a plurality of telephone sets T. An individual connecting circuit IOV and the telephone set T which is connected thereto constitute a subscriber's station A*bp*. The central connecting circuit COV is capable of transmitting the following signals to the individual connecting circuits:

(1) a central busy signal A;

(2) a plurality of central identification signals $B_i$, each of which is individually associated with a subscriber's station $Abp_i$ which is connected to the common telephone line;

(3) a central release signal C.

Each individual connecting circuit IOV is capable of transmitting the following signals to the central connecting circuit COV:

(1) an individual busy signal *a*;

(2) an individual release signal *b*;

(3) signals *m* corresponding to telephone numbers.

In the positions which differ from the normal position 1, the central connecting circuit COV is insensitive to the reception of further calls and keeps busy all the outlets of the telephone exchange not relating to the received call (signals $\alpha'$ and $\alpha''$ to the exchange) and connects the party line in the positions of incoming and outgoing calls to an outlet and an inlet, respectively of the exchange (signals $\beta'$ and $\beta''_i$). Party lines of this kind have the drawback that individual tax indication is possible only if each subscriber's station contains a tax indicator and this is, of course, an expensive solution. Consequently, in the majority of cases, a fixed rate is introduced which is independent of the number of calls exchanged. An object of the invention is to provide an economically justified solution whereby use may be made of a tax indicator circuit arranged in the telephone exchange and also secrecy ensured without taking any additional steps. The present invention is characterized by the following points:

(1) in the case of a call emanating from a subscriber's station connected to the telephone line, the calling individual connecting circuit due to the receiver being lifted transmits the individual busy signal *a* to the central connecting circuit, which answers this call by transmitting the central busy signal A to all the individual connecting circuits, whereafter the calling individual connecting circuit changes to a first auxiliary position IX in which the calling subscriber can signal a number to the central connecting circuit, which number serves as an individual identification signal $c_i$, whereas each of the other individual connecting circuits is in a preparative blocking position VIII with the receiver lying on the hook, the central connecting circuit responding to the reception of an individual identification signal $c_i$ by transmitting the central identification signal $B_i$ corresponding to signal $c_i$ to the individual connecting circuits, which can be reacted upon only by the individual connecting circuit associated to said identification signal by switching to the outgoing call position III in which a telephone number *m* can be signalled to the central connecting circuit, which telephone number is signalled on by the central connecting circuit to the exchange, whereafter the central connecting circuit is also in the outgoing call position 3;

(2) in the case of a call $p_i$ received from the exchange for the subscriber's station number *i*, the central connecting circuit first transmits the central busy signal A to all the individual connecting circuits which thus assume the preparative blocking position VIII with the receiver lying on the hook, whereafter the central connecting circuit transmits the central identification signal $B_i$ corresponding to the call $p_i$ to all the individual connecting circuits, to which the called individual connecting circuit only can react by switching to the ringing position IV with the receiver lying on the hook, whereupon the central connecting circuit transmits the ringing signal W to all the individual connecting circuits, which signal is passed on as an acoustic signal only by the called individual connecting circuit which is in the ringing position IV, whereupon lifting the receiver by the called subscriber results in the called individual connecting circuit transmitting the individual busy signal *a* to the central connector, whereafter the central connector and the called individual connector are in the incoming call positions 2 and II, respectively.

(3) that replacing the receiver in the speaking positions II and III of the relevant individual connecting circuit results in this connecting circuit transmitting the individual release signal *b* to the central connecting circuit and switching to the rest position I.

(4) that lifting the receiver in the normal position I and in the ringing position IV of the relevant individual connecting circuit results in this connecting circuit transmiting the individual busy signal *a* to the central connecting circuit.

(5) and that lifting the receiver in the blocking position VIII (and possibly VI) results in the relevant individual connecting circuit switching to a blocking position VII with the receiver lifted without transmitting any signal to the central connecting circuit.

(6) the central connecting circuit, upon reception of a release signal from the exchange and upon reception of the individual release signal *b*, transmits the central release signal C to all the individual connecting circuit, which release signal brings all the individual connecting circuits with the receiver lying on the hook to the home position I and all the individual connecting circuits with the receiver lifted to a blocking position VII with the receiver lifted, which latter position passes to the normal position I by replacing the receiver. In addition to these steps having the advantage of permitting very simple individual tax indication, they afford further advantages which will be described in detail hereinafter.

In order that the invention may be readily carried into effect, one embodiment thereof will now be described more fully, by way, of example, with reference to the accompanying drawings, in which:

FIGS. 2 and 3 show function tables of the central connecting circuit and of the individual connecting circuit respectively;

Figure 1:
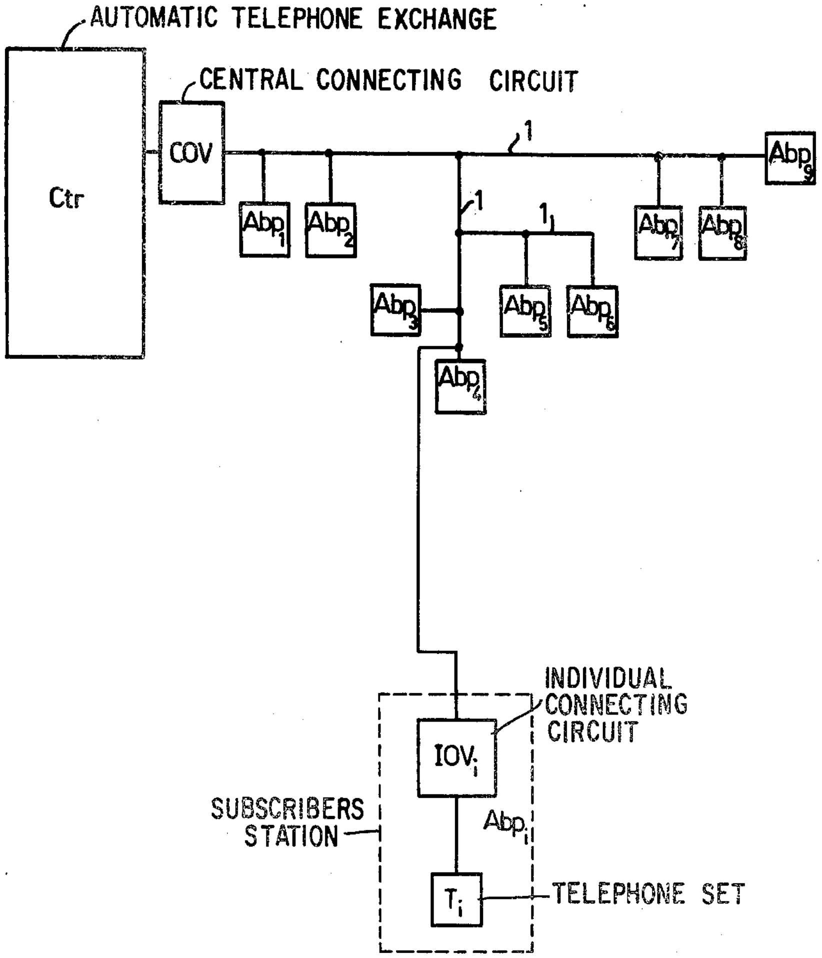
FIG. 1 shows a general diagram of a party line connected to an automatic telephone exchange, including a subscriber's station connected to the party line.

FIG. 1 shows a manner how a plurality of subscribers' stations $Abp_1$, $Abp_2$ . . . $Abp_{10}$ may be connected to a party line. The party line 1 may be a two-wire line, but alternatively be a one-line with earth as the second conductor. The party line 1 is connected via a central connecting circuit COV to an automatic telephone exchange $Ctr$. Each subscriber's station $Abp_i$ comprises a telephone set $T_i$ which is connected through an individual connecting circuit $IOV_i$ to the party line 1. Each subscriber's station connected to the party line corresponds to an individual inlet of the telephone exchange $Ctr$. This affords the advantage that use may be made of tax indicating circuits which may be arranged in the exchange, whilst the central connecting circuit is independent of the kind of these circuits. In addition, the whole may be of a design such that in the case of a call incoming from the exchange, the subscriber's station for which this call is intended is determined by the outlet of the exchange through which this call is received (more particularly the $c$-wire thereof). However, it may occur that the exchange supplies the information concerning the called subscriber's station in coded form. In this case, the central connecting circuit must include a decoder, which may be of known type. However, the central connecting circuit must at any time comprise means for making busy the outlets of the exchange relating to the party line. The kind of such means, which herein will be referred to as the busy circuit, naturally depends, as the kind of the signals between the exchange and the central connecting circuit, upon the type of exchange to which the central connecting circuit is connected. Since the charge of the call is for account of the calling subscriber, it is possible for the speech wires of the outlets of the exchange relating to the party line to be connected together.

Characteristic of the system according to the invention is more particularly the signalling. Insofar as the signalling between the exchange and the central connecting circuit is concerned, this signalling has been generalised in the diagram following hereinafter into symbols which can serve for substantially all of the exchanges in existence. The kind of the signals represented by these symbols is then, of course, dependent upon the type of the exchange. However, the system according to the invention is widely independent of the kind of the signals between the central connecting circuit and the individual connecting circuits. The alternating current signals described hereinafter proved to be very practical, more particularly since they permit of coupling the party line to the central connecting circuit and the individual connecting circuits via transformers, which simplifies save guarding.

As regards the notation employed, it is to be noted that if, for example, $\alpha$ represents a signal $\bar{\alpha}$ represents the absence of this signal. The use of symbols such as $\bar{\alpha}$ is practical more particularly if a signal $\alpha$ which was initially present ceases.

(I) Signals from the exchange $Ctr$ to the central connecting circuit COV:

$p_i$=call for the subscriber's station $Abp_i$, $\bar{p}_i$=release signal of a connection which has been built up from the exchange (signal $p_i$ ceases), $r$=release signal of a connection which has been built up from a subscriber's station connected to the party line (in the example elaborated hereinafter, this signal is a busy tone on speech level which is not percepted by the central connecting circuit. However, the signal $r$ may alternatively be obtained from changing the polarities of the voltages at the speech wires), $s$=the pilot signal (tone of 3100 c./s. on speech level), $w$=the ringing signal.

(II) Signals from the central connecting circuit COV to the exchange $Ctr$:

$\alpha'$=after a call from the exchange (signal $p_i$) all the other outlets of the exchange relating to the party line are made busy, $\alpha''$=all the outlets of the exchange relating to the party line are made busy (in case of a call made by a subscriber connected to the party line), $\bar{\alpha}$=the signals $\alpha'$ and $\alpha''$ are absent, $\beta'$=the party line is connected to the speech wires of the outlets of the exchange relating to the party line, $\beta''_i$=the party line is connected to the speech wires of the inlet of the exchange relating to the subscriber's station $Abp_i$, $\bar{\beta}$=the signals $\beta'$ and $\beta''_i$ are absent, $\sigma$=pilot signal (tone of 3100 c./s. speech level), $\epsilon$=signal corresponding to a telephone number.

(III) Signals from a subscriber's station (more particularly an individual connecting circuit) to the central connecting circuit:

$a$=the busy signal (tone of 3100 c./s. on speech level), $b$=the release signal (tone of 3300 c./s. on speech level), $c$=the identification signal (one or two series of dialling pulses; 1 dialling pulse=60 m. sec. 3100 c./s.+40 m. sec. 3300 c./s., both on speech level; time between dialling pulse series=minimum 450 m. sec. 3100 c./s. on speech level), $m$=the telephone number (a plurality of dialling pulse series as described with signal $c$).

(IV) Signals from the central connecting circuit to the subscriber's stations:

$A$=the busy signal (alternating voltage of 50 c./s. and 80 volts), $B_i$=the identification signals (tones or combinations of tones in the range of from 600 to 3000 c./s. on speech level), $C$=the release signal (pulse of 100 volts), $W$=the ringing signal (alternately 1 sec. of alternating voltage of 50 c./s. and 80 volts and 2 seconds of no voltage).

(V) Signals from a subscriber to the subscriber's station:

$\omega$=the lifting of the receiver, $\nu$=the replacing of the receiver, $\gamma$=the identification signal (the dialling of one or two digits), $\mu$=the telephone number (the dialling of a plurality of digits).

(VI) Signals from a subscriber's station to the subscriber:

$\Delta$=the ringing signal (ringing or buzzer signal), $\Lambda$=the busy signal (tone or ticker signal in telephone).

It will be evident that the invention is not limited to this specified choice of signals. For example it would fundamentally be possible to signal also with voltage levels. If alternating voltages are used for the signalling, all the frequencies employed must, of course, lie in the frequency spectrum that can be transferred by the party line.

The central connecting circuit COV and the individual connecting circuit $IOV_i$ are designed so that each of them can occupy one of a plurality of positions. In each position, the central connecting circuit COV reacts to signals supplied thereto in a given manner which is characteristic of this position. This reaction usually consists in transmitting a given signal and subsequent switching to an other position. The same is true of the individual connecting circuits IOV.

The central connecting circuit COV has fifteen positions which are indicated by the numbers 1, 2 . . . 15. Of these positions, 1 is the normal position, 2 the position of incoming calls, 3 the position of outgoing calls, 4 the position of internal calls (for calls between subscribers connected to the party line), 7 is a preparative normal position and 8 to 15 are auxiliary positions. The central connecting circuit COV is preferably designed so that the speaking positions 2, 3 and 4 pass of their own accord to the preparative normal position 7 or the normal position 1, respectively, after, for example, 9 minutes. This provides an automatic limitation of the duration of a call to 9 minutes. In addition, it is practical to design the auxiliary positions 8 to 15 so that, after expiration of a certain time, they also automatically pass to the preparative normal position 7 or the normal position 1, respectively. This period of time may be, for example, 30 seconds in the positions 8 and 10 (in which the central connecting circuit normally receives a plurality of pulse series) and, for example, 0.5 sec., in the other auxiliary positions. In each position, the central connecting circuit COV transmits a given combination of signals $\alpha'$, $\alpha''$ or $\bar{\alpha}$ and $\beta'$, $\beta''_1$ or $\bar{\beta}$ to the telephone exchange, which is indicated between brackets. Thus, for example, $\bar{6}$ ($\alpha'$, $\bar{\beta}$; W) means that the central connecting circuit in position 6 transmits the signals $\alpha'$ and $\bar{\beta}$ to the exchange and transmits the signal W to the individual connecting circuits.

Each of the individual connecting circuits $IOV_i$ have nine positions, which are indicated by the Roman figures I, II . . . IX. The position I is the home position, position II is the position of incoming calls, position III is the position of outgoing calls, position IV is the ringing position with the receiver lying on the hook, position V is the ringing position with the receiver lifted, position VI is the blocking position with the receiver lying on the hook, position VII is the blocking position with the receiver lifted, position VIII is a preparative blocking position with the receiver lying on the hook, and position IX is an auxiliary position with the receiver lifted. In the positions VII and IX, the individual connecting circuit transmits the busy signal Λ to the telephone of the relevant telephone set. In the positions IV and V, the individual connecting circuit can pass on the ringing signal W. The position VIII automatically passes to the position VI and the position IX to the position VII after a short time, for example, after 0.5 second.

FIG. 2 shows the function table of the central connecting circuit COV. In this table, for example, the formula $$1,\ p_i \rightarrow A,\ 5(\alpha',\ \bar{\beta})$$

means that, if the central connecting circuit is in position 1 and receives the calling signal $p_i$ from the telephone exchange, it transmits the signal A for a short time (for example 0.2 sec.) to the individual connecting circuits and subsequently switches to the position 5 in which the signals $\alpha'$ and $\bar{\beta}$ are transmitted to the telephone exchange. The formula $$2,\ p_i,\ \text{—}\rightarrow C,\ 7\ (\alpha',\ \bar{\beta})$$

means that, if the central connecting circuit COV is in position 2 and in this position continuously receives the signal $p_i$, but does not receive an other signal within a given time interval (for example 9 minutes), which signal may be either the signal $\bar{p}_i$ or the signal $b$, it transmits the signal C and subsequently switches to the position 7 in which the signals $\alpha'$ and $\bar{\beta}$ are transmitted to the exchange. The index $c$ with the characters $m$ and $\epsilon$ means that the telephone number is that of a subscriber not connected to the party line, the index $i$ with these characters means that the telephone number is that of the subscriber number $i$ connected to the party line.

FIG. 3 shows the function table of the individual connecting circuits $IOV_i$ with the use of an analogous notation.

The table of FIGS. 4A–4E shows for the central connecting circuit COV only the reactions to signals which the central connecting circuit in the pertinent position must react upon. As a rule, it cannot normally occur that the central connecting circuit in these different positions receives signals other than those specified. Nevertheless, it may be practical to make the central connecting circuit in each position insensitive to the signals which it must not react upon in this position. With the individual connecting circuits $IOV_i$, however, it may occur that an individual connecting circuit receives a signal, but must not react to it. It is necessary therefore that the individual connecting circuits in certain positions be insensitive to certain signals. Thus, the individual connecting circuits must be sensitive to the ringing signal W (that is to say pass on this ringing signal as a ringing or buzzer tone) only in the positions IV and V, but they must be insensitive to the ringing signal (that is to say must not transmit a ringing or buzzer tone) in all the other positions. The formulas $VII_i$, $B_i \rightarrow III$ and $VII_i$, $B_j \rightarrow VII$ (Λ) show that the $i^{th}$ individual connecting circuit reacts only to the $i^{th}$ identification signal $B_i$ by switching to the position III, but upon reception of all the other identification signals $B_j (j \neq i)$ remains in the position VII and in this position transmits the busy signal Λ to the relevant telephone set. The table of FIG. 3 does not show the reactions of the individual connecting circuit to signals for which they are insensitive in the relevant position, that is to say formulas such, for example, as VI, W→VI are omitted.

Figure 4A:
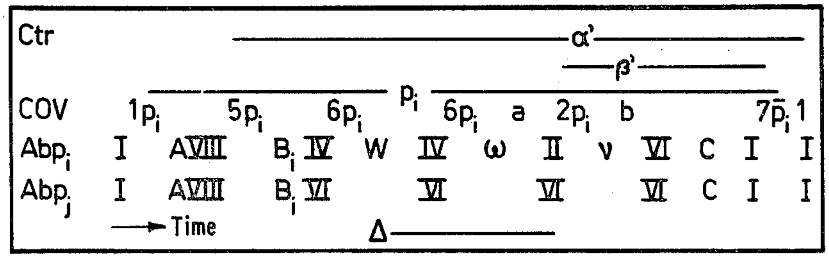
FIGS. 4 and 5 show signalling diagrams of the party line according to the invention.
Figure 4B:
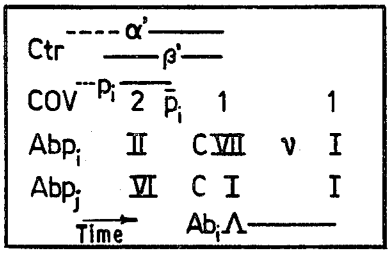
Figure 4C:
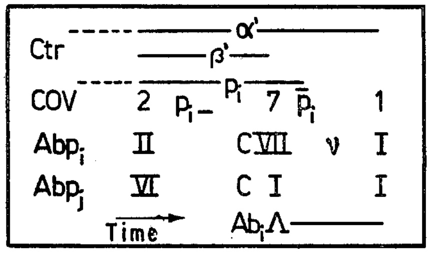

The behavior of the installation may be determined from the function tables of FIGS. 2 and 3. FIG. 4A shows the behavior of the installation if a calling signal $p_i$ is received from the exchange for the subscriber's station $Abp_i$ connected to the party line. The diagram shown in this figure must be interpreted as follows: The central connecting circuit initially is in the position 1 and all the individual connecting circuits of which the $i^{th}$ and the $j^{th}$ only are shown as representatives, are in the position I. The central connecting circuit receives the signal $p_i$ from the exchange and reacts to it by transmitting the busy signal A and switching to the position 5 (Formula 1, $p_i \rightarrow A$, $5(\alpha', \beta)$), then transmitting the signal $B_i$ associated with the calling signal $p_i$ and switching to the position 6 in which the central connecting circuit transmits the ringing signal W (Formula 5, $p_i \rightarrow B_i$, $6(\alpha', \bar{\beta}; W)$). From the position 5, all the other outlets of the exchange relating to the party line have been made busy (signal $\alpha'$) so that other subscribers can no longer make calls to a subscriber connected to the party line. The busy signal A brings all the individual connecting circuit to the preparative blocking position VIII (Formula I, A→VIII), the subsequent signal $B_i$ brings the individual connecting circuit of the $i^{th}$ subscriber's station to the ringing position IV (Formula $VIII_i$, $B_i \rightarrow IV$), but the individual connecting circuit of the other subscribers' stations do not react to the signal $B_i$ and jump into position VI (Formula VIII, —→VI). The individual connecting circuit of the $i^{th}$ subscribers' station only transmits the ringing signal W as a ringing or buzzer tone Δ. The other individual connecting circuit do not react to the signal W and remain in the blocking position VI. As soon as the called subscriber lifts his receiver (signal $\omega$), his individual connecting circuit transmits the signal $a$ to the central connecting circuit and switches to the incoming call position II. The central connecting circuit which was in the position 6 reacts to the signal $a$ by switching to the incoming call position 2, so that the transmission of the signal W ceases. When, after the call is over, the called subscriber replaces his receiver (signal $\gamma$) his individual connecting circuit transmits the release signal $b$ to the central connecting circuit and switches to the blocking position VI. The central connecting circuit reacts to the reception of the release signal $b$ by transmitting the release signal C, which signal is received by all the individual connecting circuit. Since all of them are now in the position VI, they all switch to the normal position I due to the reception of the signal C. After the transmission of the release signal C, the central connecting circuit has assumed the preparative normal position 7, in which position the signal $\alpha'$ ceases. The telephone exchange detects this due to the subscribers' loop being opened and thus breaks up the path built up in the exchange, so that after a short time the signal $p_1$ ceases (signal $\overline{p}_1$) and this brings the central connecting circuit again to the normal position 1. FIG. 4B shows the case that the connecting circuit is broken up by the subscriber who is not connected to the party line. The central connecting circuit then receives the signal $\overline{p}_1$ ($p_1$ ceases), so that it transmits the release signal C and switches to the normal position 1. The signal C brings the called individual connecting circuit to the preparative normal position VII in which the busy signal A is led to the telephone set, and all the other individual connecting circuits to the normal position I. By replacing the receiver, the called individual connecting circuit also assumes the normal position I, so that the busy signal A ceases. FIG. 4C shows the case that the call has lasted longer than a given time, for example 9 minutes (signal —). In this case, the central connecting circuit transmits the release signal C and switches to the position 7, whereafter the further breaking up of the connection takes place in the manner described with reference to FIG. 5.

Figure 4D:
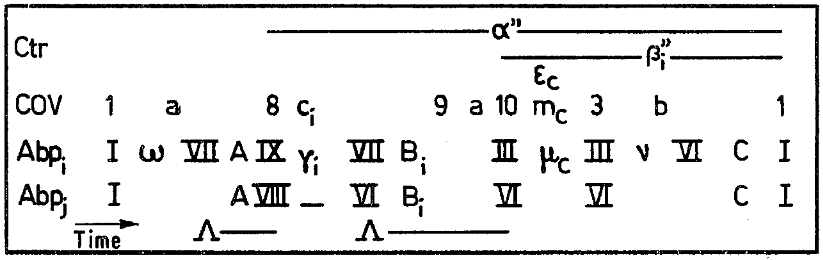
Figure 4E:
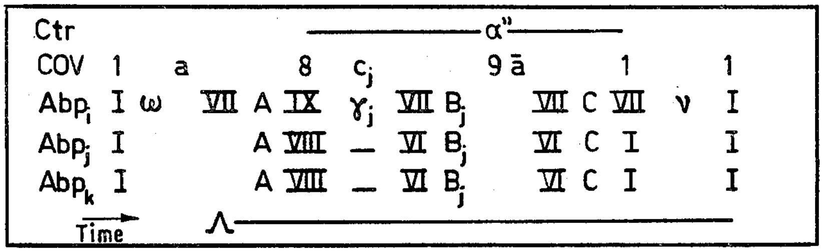

FIG. 4D illustrates the case in which a subscriber connected to the party line wishes to establish a connection with a subscriber who is not connected to the party line. He first lifts his receiver (signal $\omega$) so that his individual connecting circuit transmits the busy signal $a$ to the central connecting circuit and jumps into the position VII. The central connecting circuit reacts to this by transmitting the busy signal A to all the individual connecting circuits, so that the calling individual connecting circuit switches to the auxiliary position IX and all the other individual connecting circuits switch to the blocking position VIII. Subsequently, the calling subscriber must send his identification signal $c_1$ to the central connecting circuit. This consists in dialling a number, for example, the last digit or the last two digits of his telephone number. During the dialling of this number, all the non-calling individual connecting circuits have automatically switched to the position VI. The central connecting circuit has been brought to the position 8 by the signal $a$ and in this condition reacts to the reception of the signal $c_1$ by transmitting the associated signal $B_1$ and switching to the position 9. The calling individual connecting circuit has assumed the position VII due to the dialling of the number and in this position reacts to the signal $B_1$ by transmitting the signal $a$ and switching to the outgoing call position III. The central connecting circuit is brought to the position 10 by the signal $a$. The calling subscriber can now dial the telephone number desired. If this is the number of a subscriber who is not connected to the party line, as indicated by index $c$ in FIG. 8, the central connecting circuit switches to the outgoing call position 3 and the call can start as soon as the called subscriber has lifted his receiver. When the calling subscriber replaces his receiver (signal $\nu$), his individual connecting circuit transmits the release signal $b$ to the central connecting circuit and switches to the position VI. The central connecting circuit reacts thereto by transmitting the release signal C to all of the individual connecting circuits and switching to the normal position 1. The release signal C brings all the individual connecting circuits to the normal position I. FIG. 4E shows what happens if a subscriber sends a wrong identification signal $c_j$ to the central connecting circuit. In this case does not the central connecting circuit transmit the identification signal $B_1$ associated with the calling subscriber, but transmits the identification signal $B_j$ associated with the wrong signal $c_j$. As a result thereof, his individual connecting circuit remains in the blocking position VII and a connection cannot be established. The central connecting circuit which in the meantime has assumed the position 9, cannot now receive the signal $a$, since none of the individual connecting circuits is in a position in which it can transmit the signal $a$. Since the central connecting circuit does not receive the signal $a$ within a given time, for example 0.2 second, it transmits the release signal C and switches to the normal position 1. The signal C brings all the blocked individual connecting circuits to the normal position I. The calling subscriber can bring his individual connecting circuit to the normal position I only by replacing his receiver. During the time that his individual connecting circuit was in the position VII, he has heard the busy signal A in his telephone. The signalling here described makes it impossible for a subscriber to telephone at the expense of another subscriber if the exchange contains a tax indicating circuit.

Figure 5A:
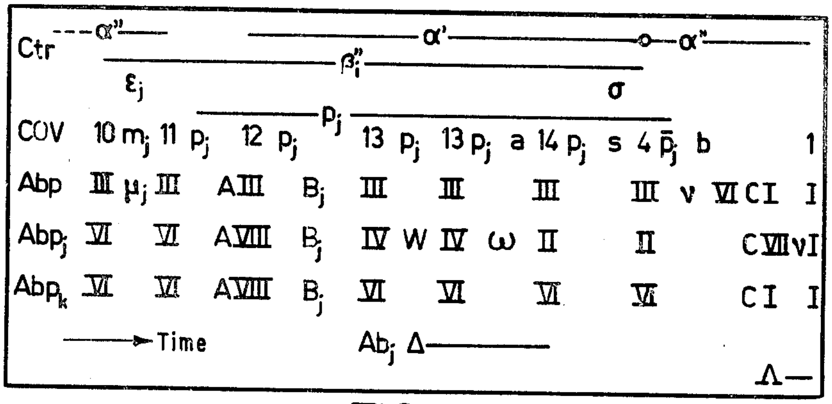

FIG. 5A relates to the case that a subscriber connected to the party line rings up another subscriber connected to this party line. If the central connecting circuit identifies the telephone number dialled by the calling subscriber as the telephone number of subscriber number $j$ of the party line (indicated by the index $j$ in FIG. 5A) the central connecting circuit does not switch to the speaking position 3, but switches to a position 11 in which it is again sensitive to calls from the exchange (the signal $\alpha''$ ceases). This signal is actually received, since due to the dialling of the telephone number the calling subscriber builds up a path in the exchange from the inlet associated with this subscriber to the outlet of the exchange associated with the called subscriber. Due to the reception of calling signal $p_j$ from the exchange, the central connecting circuit transmits the busy signal A, to which the calling individual connecting circuit does not react, but which brings all the other individual connecting circuits to the position VIII. Subsequently, the central connecting circuit transmits the identification signal $B_j$ associated with the incoming calling signal $p_j$, so that the called individual connecting circuit switches to the ringing position IV and the other individual connecting circuits, except the calling one, switch to the position VI. Next, the central connecting circuit transmits the ringing signal W. The calling individual connecting circuit, which is in the position III, does not react to the signals A, $B_j$ and W. When the called subscriber lifts his receiver, his individual connecting circuit transmits the signal $a$ so that the central connecting circuit, which in the meantime has assumed the position 13, is brought to the position 14, whilst the called individual connecting circuit has assumed the position III due to the lifting of the receiver. Since it is possible for the incoming calling signal to originate from a subscriber who happens to ring up at the same moment, but who is not connected to the party line, in the position 14 the pilot signal $\sigma$ is led on speech level to the inlet of the exchange associated with the calling subscriber. If the incoming calling signal $p_j$ actually originates from the connection built up by the calling subscriber, this signal is received back at the outlet of the exchange (signal $s$) and the reception of this signal causes the central connecting circuit to jump into the speaking position 4. In this position of the central connecting circuit, the inlet of the exchange associated with the calling subscriber is released again, so that after a short time the signal $p_j$ disappears, while at the same time all the outlets of the exchange connected to the central connecting circuit are made busy ("signal $\alpha'$ changes to $\alpha''$"). The two subscribers connected to the party line can now talk to each other without occupying a path in the exchange.

Figure 5B:
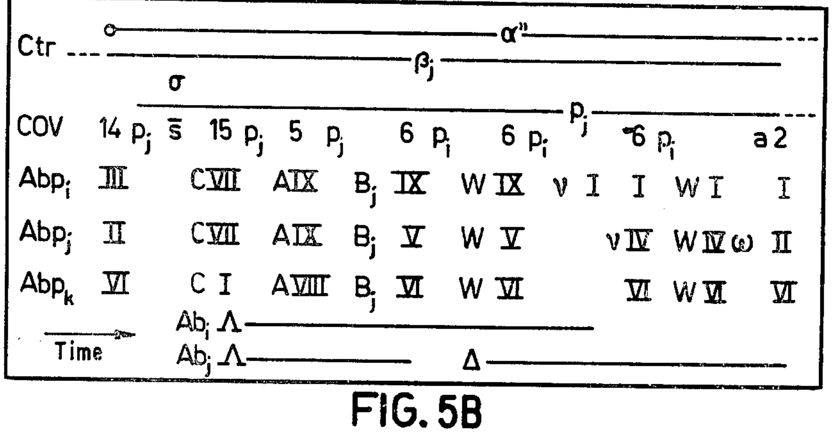

FIG. 5B relates to the case that in position 14 of the central connecting circuit the pilot signal does not come back at the outlet of the exchange. This implies for the central connecting circuit the information that the incoming call does not originate from the calling subscriber connected to the party line. It reacts thereto by transmitting the signal C and switches to the position 15. The signal C brings the individual connecting circuits $IOV_i$ and $IOV_j$, which were initially connected together through the exchange, to the position VII and all the other individual connecting circuits to the position I. In position 15, the central connecting circuit transmits the signal A and then switches to the position 5. Consequently, the two individual connecting circuits $IOV_i$ and $IOV_j$ switch to the position IX and all the other individual connecting circuits into the position VIII. The central connecting circuit now transmits the signal $B_j$ associated with the calling signal $p_j$ and this brings the called individual connecting circuit to the ringing position (IV or V), irrespective of whether its receiver lies on the hook or not. A subscriber whose individual connecting circuit is in the position IX and who thus hears the busy signal Λ in his telephone, can now do nothing but replace his receiver so that the busy signal in his telephone ceases and his individual connecting circuit switches to the normal position I. The called subscriber, the subscriber No. $j$ in FIG. 11, receives the ringing signal Δ despite the fact that he has lifted his receiver. If he reacts to this phenomenon unusual for him by replacing his receiver (signal $\nu$), his individual connecting circuit switches to the position IV in which the ringing signal Δ remains. When he again lifts his receiver (signal $\omega$), his individual connecting circuit switches to the incoming call position II.

The individual connecting circuits are so programmed that lifting of the receiver in the blocking positions VI and VIII (in which the receiver lies on the hook) brings the individual connecting circuit to the blocking position VII with the receiver lifted, in which position the busy signal Λ is emitted (Formulas VI, $\omega \rightarrow$VII(Λ) and VIII, $\omega \rightarrow$VII(Λ)). He cannot thus disturb connections existing at this moment and neither can he monitor. When a subscriber whose individual connecting circuit is in the normal position I, lifts his receiver at a moment when the party line is in use, which is possible in the case of FIG. 11, his individual connecting circuit emits the signal $a$ to the central connecting circuit and switches to the position VII in which he hears the busy signal Λ in his receiver. The central connecting circuit must therefore be so programmed that in the position 2 it does not react to the signal $a$.

The programming of the individual connecting circuit involves the phenomenon that a subscriber whose receiver is lifted can nevertheless be rung. This constitutes an advantage of the system according to the invention over known systems. The fact of the receiver not lying on the hook may be the result, for example, of careless placing.

It will readily be evident that modifications which are not essential can be made to the tables of FIGS. 2 and 3 and hence to the diagrams of FIGS. 4A–4E and 5A–5B. Thus, for example, the performance of the system substantially does not change if the individual connecting circuits are so designed that they switch from the normal position I directly into the auxiliary position IX by lifting the receiver and that, upon replacing the receiver, they switch from a speaking position II or III directly into the normal position I. In addition, the central connecting circuit may be programmed so that position 13, due to the reception of the signal $a$, directly passes to the position 4 and hence the transmission of the pilot signal does not take place (see FIGS. 5A and 5B). However, the system thus slightly loses in efficaciousness. The same is true if the central connecting circuit is programmed so that calls between subscribers connected to the party line always pass via the exchange.

Another feature of the system according to the invention is that the busy signal Λ is locally produced (that is to say in the relevant individual connecting circuit). This makes it necessary for each individual connecting circuit to have its own current source, but this current source may be a dry battery by using transistor circuits and midget relays. However, this makes it desirable for the individual connecting circuits to be programmed so that current consuming circuits are switched in only when this is necessary. For this reason it is practical, for example, to design the individual connecting circuits so that the position VIII, in which the amplifier in the detector for the signals $B_i$ is switched in, after lapse of a short period, for example, 0.5 second, passes to the position VI in which this amplifier is switched off and hence the individual connecting circuit is no longer sensitive to these signals.

With the above-described choice of signals to which the invention is not limited, however, use is made of signals on speech level ($B_i$, $a$, $b$, $c_i$, $m$, the speech signal) and signals on a very much higher level (A, C). It is therefore desirable for the assembly to be designed so that the detectors for the signals on the high level cause the least possible damping for the signals on the low level and more particularly the speech signal. This may be achieved by connecting the detectors for the signals on the high level through circuit elements having thresholds for example diodes, to the party line.

In addition, it is necessary for the assembly to be so designed that the signals on the high level cannot damage the circuits intended for the signals on the low level. This applies more particularly to the telephone sets. This object may be attained by providing each of the detectors for the signals on the high level with a relay which is energized by the detection of these signals and which, in the energized position, interrupts the connections between the vulnerable circuits, including the telephone sets, and the party line.

For the signals $a$ and $b$ there are mentioned, by way of example, alternating voltages on speech level having frequencies of 3100 c./s. and 3300 c./s. This, or an equivalent, choice affords the advantage that such voltages may be produced by means of a generator having a tunable circuit. Due to the frequencies being close to each other, they can pass to each other substantially without transition, which enables them to be used for signalling digits. However, the arrangement must then be such that oscillations of the said frequencies which occur in speech signals have no interfering effect. It is practical therefore to provide the member for detecting these signals with a bandpass filter which must pass both signals, but the building-up time of which is such that the detecting member, as a result of the retardation involved, is much less sensitive to frequencies equal to those of the signals $a$ and $b$ which occur in the speech signal. For further safeguarding, the member detecting the signals $a$ and $b$ may still be provided with a relay circuit which reacts to the signals $a$ and $b$ with a retardation of, for example, 0.5 sec. This relay circuit may, for example, be designed so that, due to the reception of signal $a$, it assumes after, say, 0.5 sec., a position in which it is sensitive only to signal $b$ and this with a retardation likewise of 0.5 sec., but in which rapid changes of the signals $a$ and $b$ which correspond to dialling pulses are transmitted substantially without distortion.

In addition, the individual connecting circuit, may be such that, in the normal position, it transmits the release signal C with a given recurrence frequency, for example every ten minutes. An individual connecting circuit which, due to an interference or for whatever reason, has missed a release signal C, can then react to a release signal which comes at most ten minutes later.

Several of the subscribers' stations may be provided with a switch coupling the receiver directly to the party line, so that the relevant subscriber can listen in to an existing telephone communication. This may, or may not, be accompanied by a monitoring signal, for example a ticker signal.

It is alternatively possible to provide several of the subscribers' stations with a switch, the closure of which causes the individual connector to transmit the release signal $b$ to the central connecting circuit, which reacts to this signal by transmitting the release signal C which makes the party line free on behalf of the relevant subscriber. The switches referred to may be push-button switches.

Figures 6, 7, 8:
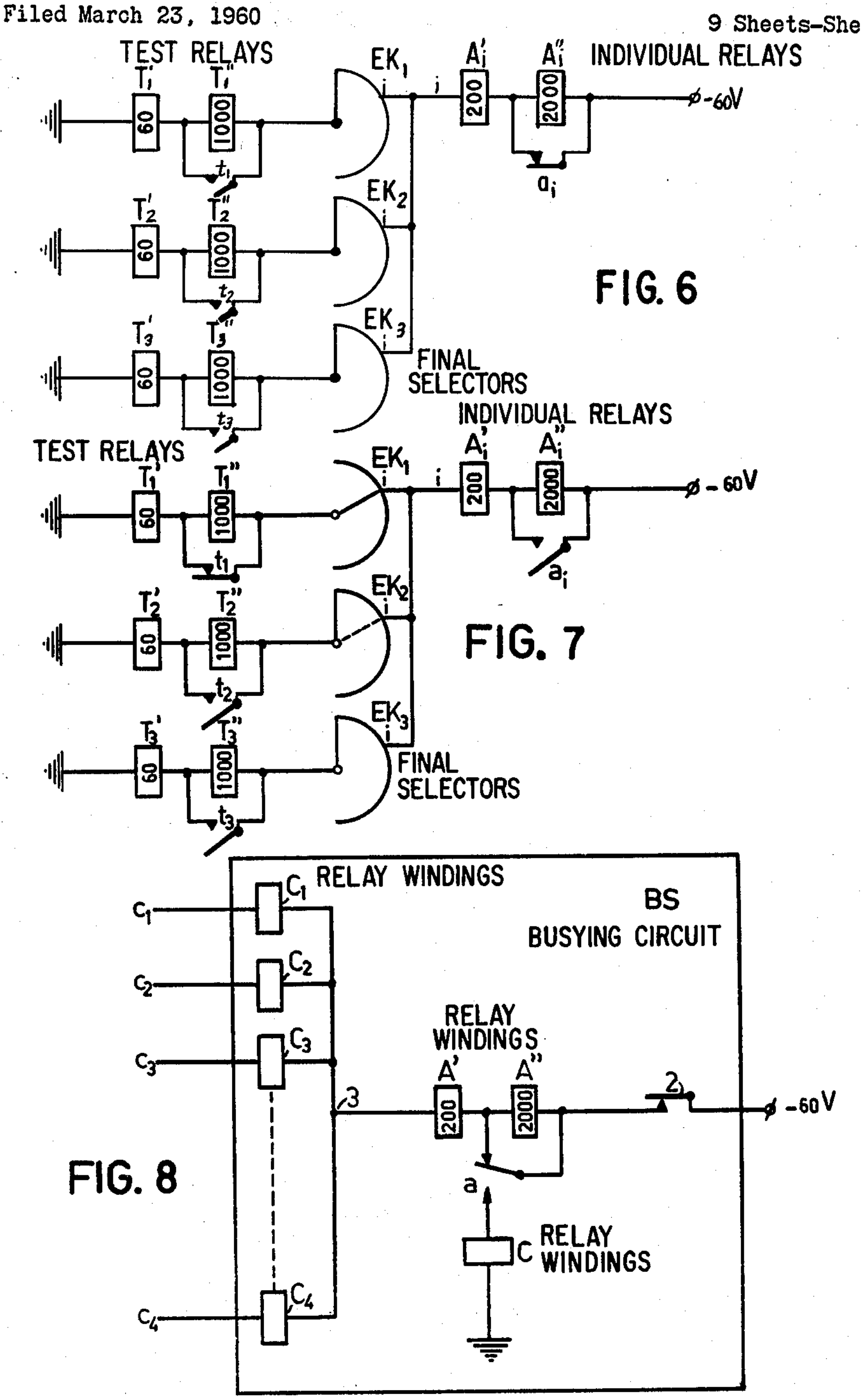
FIGS. 6 and 7 show in what manner an outlet is made busy in an automatic telephone exchange having rotary switches.
FIG. 8 shows the busy circuit of the central connecting circuit which is connected to a telephone exchange having its outlets made busy in the manner shown in FIGS. 12 and 13.

FIGS. 6 and 7 show in what manner in many telephone exchanges an outlet is made busy. For the sake of simplicity, it has been assumed that only three final selectors $EK_1$, $EK_2$, $EK_3$ give access to a given outlet *i*. FIGS. 6 and 7 show only the circuits relating to the *c*-arcs of the final selectors. The contact arm of each final selector is connected to a test relay $T_k (k=1, 2, 3)$ having two windings $T_k'$ and $T_k''$ of 60 ohms and 1000 ohms, respectively. The bench contacts of the final selector are multipled and each set of multipled bench contacts is connected through an individual relay $A_i$ associated with the relevant outlet *i* of the exchange and having two windings $A_i'$ and $A_i''$ of 200 ohms and 2000 ohms, respectively, to a voltage source of −60 volts. The relay winding $T_k''$ is bridged by a make contact $t_k$ of test relay $T_k$ and the relay winding $A_i''$ is bridged by a break contact $a_i$ of relay $A_i$. FIG. 6 shows the rest position of the circuit. If, when a call is made, the final selector $EK_1$ is adjusted to the bench contact *i*, a current of about 48 milliamps flows from earth via relay winding $T_1'$, relay winding $T_1''$, contact arm of final selector $EK_1$, relay winding $A_i'$ and contact $a_i$ to the voltage source. The test relay $T_1$ is thus energised and then with some retardation (due to the short-circuit of relay winding $A_i''$) also the relay $A_i$. The position has then arisen as shown in FIG. 7 in which the current through the relay windings $T_1'$, $A_i'$ and $A_i''$ has decreased to about 27 milliamps. The relays $T_1$ and $A_i$ remain in the energised position with this current. The energised state of test relay $T_1$ means for the telephone exchange that the called subscribers' set was free. However, if now another final selector, for example final selector $EK_2$, is also adjusted to bench contact *i* (see dotted position of the contact arm of final selector $EK_2$ in FIG. 7), the series-connected relay windings $T_2'$ and $T_2''$ are parallel to the relay winding $T_1'$. A current of about 2 milliamps now flows through the relay windings $T_2'$ and $T_2''$, which current is insufficient for energising test relay $T_2$. The relay winding $T_1'$ is now traversed by a current of about 25 milliamps, which current keep this relay in the energised condition. The relay $A_i$ also remains in the energised condition. The fact of relay $T_2$ not being energised implies for the telephone exchange the information that the relevant subscribers' set was busy and a connection through final selector $EK_2$ to this subscribers' set must not be built up.

FIG. 8 shows the circuit BS for busying the central connecting circuit. In this figure, $c_1, c_2, c_3 \ldots c_n$ indicates the *c*-wires of the *n*-outlets of the exchange which give access to the party line. Each wire thus corresponds to the multiplied wire *i* of FIGS. 6 and 7. After having traversed the relay windings $C_1, C_2, C_3 \ldots C_n$, the *c*-wires are connected together and the junction point 3 of the *n* *c*-wires is connected through the two windings A′ and A″ of a relay A, which is common to the *n* outlets, and a break contact 2 to the negative voltage source. The break contact $a_1$ of FIGS. 6 and 7 is replaced by a change-over contact *a*, the whole being so designed that switching-over of the change-over contact *a* causes energisation of a relay C.

FIG. 8 shows the normal condition of the busying circuit BS. In the case of a call from the exchange for subscriber No. *i* of the party line, the wire $c_i$ is connected to earth. The relays $C_i$ and A are thus energised so that contact *a* is switched-over and relay C is energised. The energisation of the relays C and $C_i$ implies for the central connector the information that a call from the telephone exchange is on hand and that this call is intended for subscriber No. *i* (signal $p_i$) who is connected to the party line. For the reason previously explained with reference to FIG. 7, all the other outlets having access to the party line have been made busy (signal $\alpha'$). The function of the relays $C_i$ may be taken over, if desired, by the test relays $T_i$ (FIGS. 6 and 7). If the contact 2 is open, all the outlets of the telephone exchange which have access to the party line have been made busy, since in this case neither the test relays nor the relay A can be energised. This is the signal $\alpha''$ which must be given in the case of a call made by a subscriber of the party line.

Figure 9:
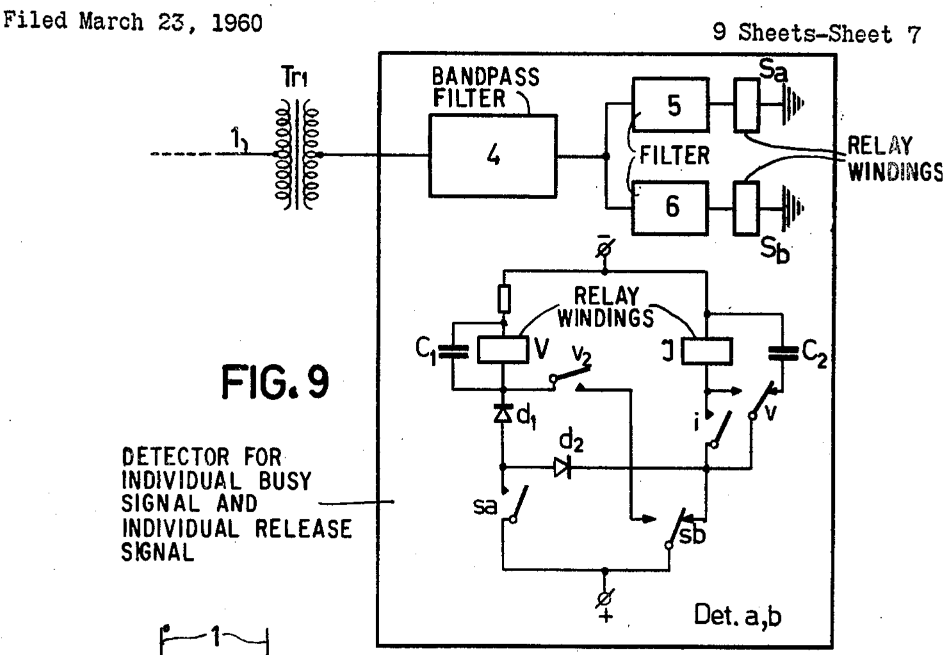
FIG. 9 shows a circuit for detecting the individual busy signal and the individual release signal.

FIG. 9 shows an example of a circuit for detecting the signals *a* and *b*. In this circuit, 4 indicates a bandpass filter which passes both signals *a* and *b* with a building-up time of, for example, 0.1 sec., 5 indicates a filter which passes only the signal *a* (and hence checks signal *b*), 6 is a filter which passes only the signal *b* (and hence checks signal *a*), *Sa*, *Sb*, V and I indicate relay windings, $C_1$ and $C_2$ are capacitors and $d_1$ and $d_2$ are diodes.

If the party line contains the signal *a*, *Sa*, is energised and hence relay V is energised with a retardation of for example, 0.5 sec., which is determined by capacitor $C_1$. If signal *a* is of duration shorter than 0.5 sec., nothing happens. Due to the energisation of relay V, relay I is energised, so that contact *i* closes and relay I becomes independent of relay V. The disappearance and possible return of signal *a* thus influences relay V, but does not act upon relay I.

If, in the energised condition of relay I, signal *b* is received, the relay *Sb* is energised, so that relay I is released with a retardation of, for example, 0.5 sec. which is determined by capacitor $C_2$. A signal *b* which lasts shorter than 0.5 sec. thus has no influence. Also simultaneous detection of the signals *a* and *b* does not affect the relay I, since it remains energised via contact *sa*, diode $d_2$, contact *i* and the relay winding I. Reception of signal *b* without preceding reception of signal *a* has no effect, since contact $v_2$ is then open.

During signalling digits, the signals *a* and *b* alternate substantially without transitions. The relay V thus remains energised, since the energisation path of this relay extends either through contact *sa* and diode $d_1$, or through contact *sb* and contact $v_2$. The retardation brought about by capacitor $C_1$ prevents the contact $v_2$ from opening during the very short transitions possible from signal *a* to signal *b*. Each time the signal *a* is replaced by signal *b*, the relay I is released without retardation, since capacitor $C_2$, due to contact $v_2$ being changed-over, is not parallel to the relay winding I and the energisation path of the relay winding is then interrupted at *sa* and *sb*. As soon as signal *b* is again replaced by signal *a*, the relay I is again energised without retardation, since the energisation path of the relay winding I is then closed through both contact *sa* and contact *sb*. The relay I may thus be used for transmission of the dialing pulses.

Figure 10:
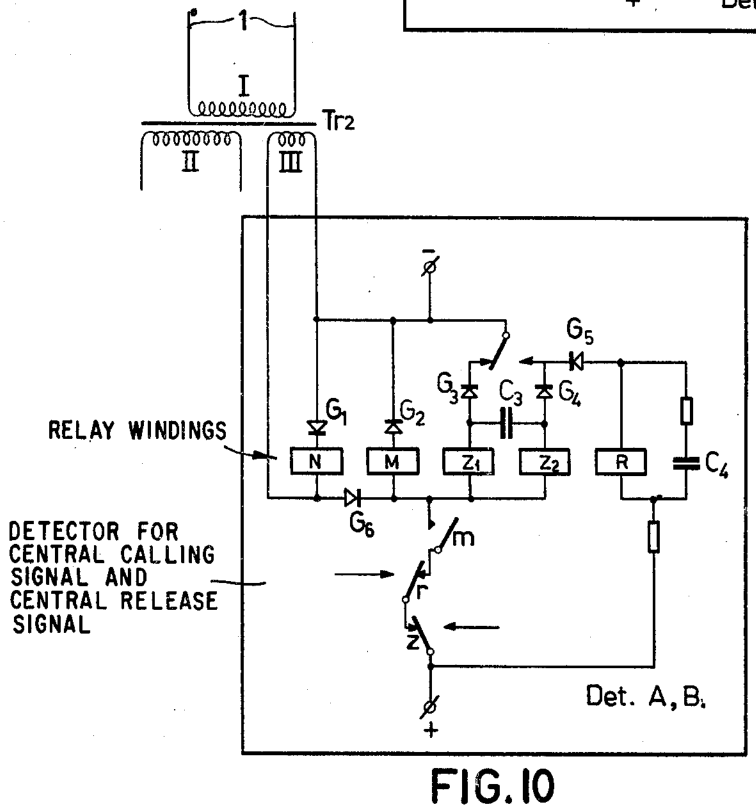
FIG. 10 shows a circuit for detecting the central calling signal and the central release signal.

FIG. 10 shows an example of a circuit for detecting the signals A and C. In this figure, $Tr_2$ indicates the transformer through which the party line 1 is coupled to the individual connecting circuit, N, M, $Z_1$, $Z_2$ and R indicate relay windings, $C_3$ and $C_4$ indicate capacitors, and $G_1, G_2, G_3, G_4, G_5$ indicate diodes. The windings I and II of the transformer have a winding ratio of about 1:2 and the windings I:III have a winding ratio of 5:1. The winding I is connected to the party line 1, the winding II to the receiver and the winding III to the detector for the signals A and C. The diodes $G_1$ and $G_2$ each have a threshold voltage of about 0.5 volt. The signals on speech level (including the speech signal itself) have a level of at the most 0.7 volt in the party line 1 and hence of at the most 0.14 volt through the winding III. The circuit for detecting the signals A and C is thus wholly insensitive to signals on speech level and does not exert any damping action upon them, which is important especially for the speech signal.

Let it be assumed that the party line contains the signal A, that is to say an alternating voltage of 50 c./s. and 80 volts. This provides across winding III an alternating voltage of 50 c./s. and 16 volts. The relay N is thus energised and released with a frequency of 50 c./s. The first time the relay M is energised, the relay winding M remains energised via the contacts *z*, *r* and *m*. In the rest condition relay N, the two windings $Z_1$ and $Z_2$ are energised, but counteract each other, so that relay Z is not energised. In the operating condition of relay N, capacitor $C_3$ discharges and may be even charged in the opposite sense. Thus, the relay Z cannot be energised so long as the signal A remains.

The presence of capacitor $C_4$ and diode $G_5$ causes relay R to be energised with retardation. The circuit is so proportioned that the relay R is not energised until after four or five cycles of the alternating current signal A. Due to the energisation of relay R, the contact *r* opens and relay Z is disconnected from its voltage source. The relay M now also starts to be energised and released with a frequency of 50 c./s. The switching-over of change-over contact *r* due to the energisation of relay R is utilised for performing the necessary switching functions in the individual connecting circuit.

If the detecting circuit receives a pulse or one cycle of the alternating voltage, the relay R cannot be energised, but relay M remains energised via the contacts *z*, *r* and *m*. The relay Z is thus energised with retardation and the switching-over of change-over contact *z* is utilised for performing the required switching functions in the individual connecting circuit. The relay M is de-energised due to switching-over of contact *z*.

It is possible to provide both electro-mechanical and electronic circuits which are programmed in the manner above described for the central connecting circuit and for the individual connecting circuits. Hereinafter follows a short description of an example of a central connecting circuit.

Figure 11:
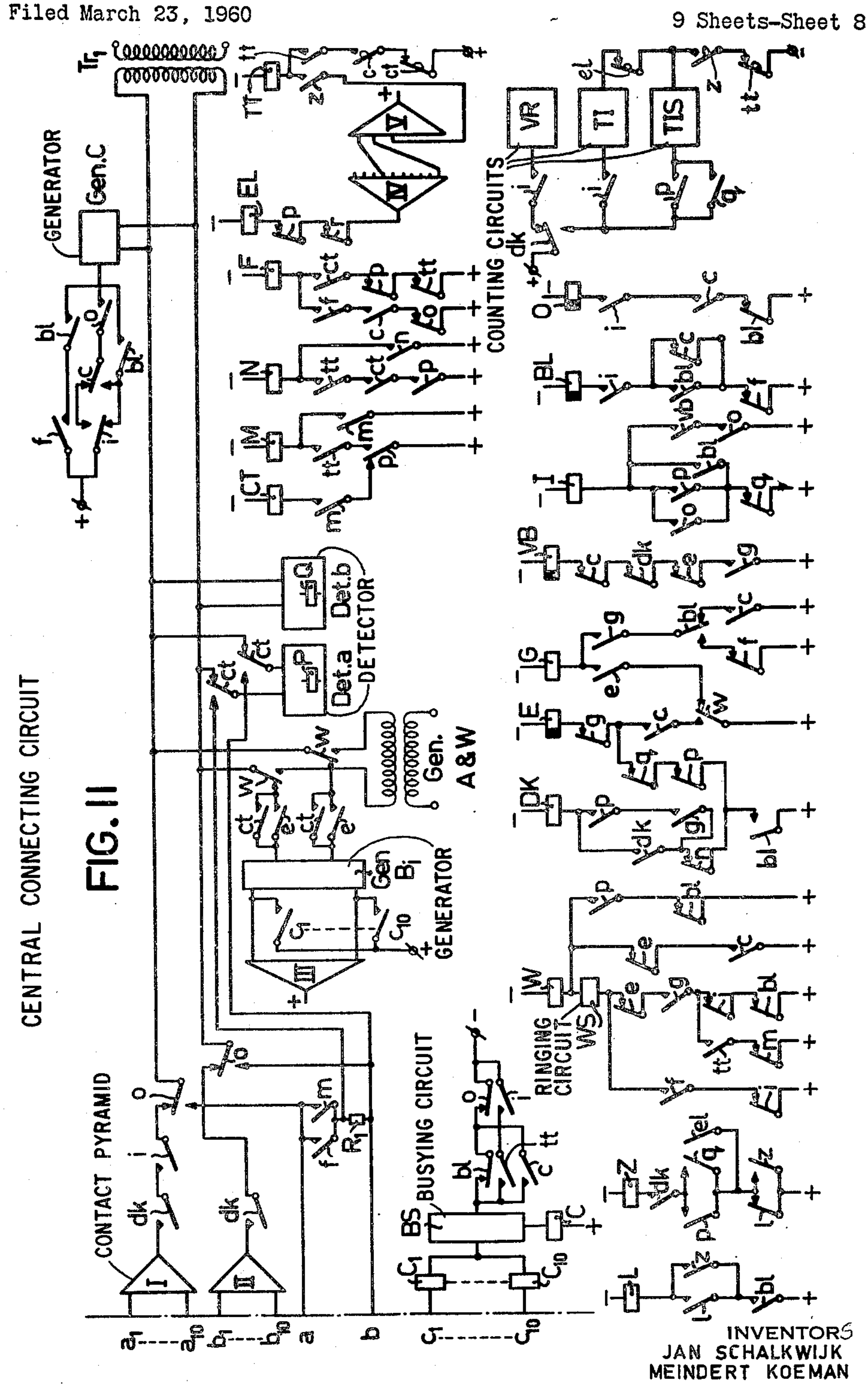
FIG. 11 shows a circuit for the central connecting circuit.

FIG. 11 shows an example of the circuit of the central connecting circuit COV.

*A1—Call from the telephone exchange to a line subscriber (for example, line subscriber No. 3).*—In the manner previously described, relay $C_3$ of the busying circuit BS is energised and so is the relay C. The energisation of relay C causes energisation of relay W, so that the alternating current of 50 c./s. and 80 volts is put on the party line. This is the signal A which blocks all the individual connecting circuits. The energisation of relay W also causes energisation of relay E, which relay prepares the transmission of the identification signal $B_1$. Due to the energisation of relay $C_3$, the indentification tone generator is tuned to the identification signal $B_1$. The energisation of relay E causes the release of relay W and the energisation of relay G, which in turn causes the relay E to be released slowly. During the release time of relay E, the identification signal $B_1$ is transmitted.

As soon as relay E is released, a ringing circuit WS is energised, so that the relay W is alternately energised for one second and released for two seconds. When relay W is energised, alternating voltage is applied to the line, which alternating voltage constitutes the ringing signal W.

When the called subscriber lifts his receiver, his individual connecting circuit transmits the signal *a*, for a short time, that is to say, an alternating voltage of 3100 c./s. on speech level. The detector for the signal *a* detects this signal thus causing energisation of a relay P. The energisation of relay P causes energisation of relay I and the energisation of the last-mentioned relay causes energisation of a relay O. The line wires of the outlet of the exchange relating to the party lines are thus connected to the party line. The exchange thus detects the closure of the subscribers' loop and stops transmitting a ringing signal. At the same time, the energisation of the ringing circuit WS in the central connecting circuit is interrupted so that the transmission of the ringing signal by the central connecting circuit also ceases. The conversation may thus start.

*A2—Interrupting of the connection by the telephone exchange.*—When the subscriber who is not connected to the party line replaces his receiver, the connection in the telephone exchange is interrupted, so that the relay $C_3$ is also released. The busying circuit BS in the central connecting circuit thus assumes the normal condition and all the oulets of the exchange are made free. The release of relay C brings about retarded release of relay O. During the time that relay C is released, but relay O is still energised, the generator for the signal C is energised, which thus transmits a pulse in the party line, which pulse constitutes the release signal C.

*A3—Breaking-up of the connection by the line subscriber.*—When the line subscriber terminates the call by replacing his receiver, his individual connecting circuit transmits for a long time the release signal *b* (3300 c./s. on speech level). In the central connector, this signal is detected by the detector of signal *b*, causing of relay Q to be energised. The energisation of relay Q causes the release of relay I, so that relay O is again released with retardation. During the time that relay Q is released, but relay O is still energised, the generator for the signal C again transmits a pulse in the party line, which pulse constitutes the release signal.

*A4—Call from a subscriber at the party line to a subscriber of the exchange.*—When a line subscriber lifts his receiver, his individual connecting circuit transmits the busy signal *a* (3100 c./s. on speech level) to the central connecting circuit. This signal is detected in the central connecting circuit, thus causing energisation of relay P. The energisation of relay P causes energisation of relay I, and the energisation of the latter relay causes energisation of a relay BL. Due to the energisation of relay BL, the busying circuit is disconnected from the local battery, which, as has previously been explained with reference to FIG. 14, amounts to busying all the outlets of the telephone exchange relating to the party line. During the time that relay P is energised, but relay BL is not yet energised, the relay W is energised so that during this time the alternating voltage of 80 volts and 50 c./s. is put on the party line, which voltage constitutes the signal A.

The central connecting circuit after some time now receives the identification signal from the calling subscriber. In the example described, this is a digit, for example, the last digit of his telephone number. This digit will be referred to hereinafter as the pre-digit.

In the manner described with reference to FIG. 11, the pulses transmitted by the calling individual connecting circuit are detected in the detector for the signals *a*, *b*. The relay I is energised as many times as the calling individual connecting circuit has transmitted pulses. These pulses are counted in a counting circuit VR. When the calling subscriber has dialled the correct pre-digit, for example the pre-digit 3, the counting circuit VR has been put in position 3. Consequently, the contact pyramids I and II are adjusted to the inlet of the telephone exchange associated with the calling subscriber No. 3, whereas the contact pyramid III adjusts the generator for the signals $B_1$ to the identification tone No. 3. In addition, the relay E is energised, so that the relay G is energised, resulting in the relay E being released with retardation. During the time that relay E is still energised, a signal $B_3$ is transmitted to the individual connecting circuit so that the calling individual connecting circuit assumes the speaking position III and sends back the signal *a* (3100 c./s. on speech level) for a short time to the central connecting circuit. This signal is detected in the central connecting circuit, thus causing energisation of relay P and hence energisation of a relay DK. The latter energisation results in the counting circuit VR being switched off. However, the contact pyramids I and II remain in the positions already assumed through a plurality of holding relays.

Through contacts of the relay DK, a direct-current path to the telephone exchange is closed, so that the calling subscriber receives the dialling tone from the exchange. When he starts to dial, the pulses transmitted by his individual connecting circuit are again converted into direct-current pulses by relay I in the manner previously described and transferred to the telephone exchange. If the called subscriber is free, he hears the ringing tone from the telephone exchange. As soon as the called subscriber has lifted his receiver, the conversation can start.

*A5—Termination of the conversation by the line subscriber.*—When the line subscriber replaces his receiver, his individual connecting circuit transmits for a long time the release signal *b* (3300 c./s. on speech level). This signal is detected in the central connecting circuit, causing energisation of the relay Q. Consequently, relay I is de-energised, which in turn causes retarded de-energisation of relay BL. During the time that relay I is already released, but relay BL is still energised, the generator of the signal C transmits the release signal in the party line. The release of relay BL causes release of all the other relays in the central connecting circuit, so that the latter assumes the normal position. The exchange detects the breaking-up of the subscribers' loop and thus interrupts the path built up in the exchange.

*A6—Termination by the subscriber of the telephone exchange.*—When the subscriber connected to the telephone exchange replaces his receiver, the line subscriber hears the busy signal from the telephone exchange. The central connecting circuit itself does not react to this signal, but the subscriber of the party line likewise replaces his receiver so that his individual connecting circuit and the central connecting circuit assume their normal conditions in the manner previously described.

*A7—A line subscriber selects the telephone number of another subscriber of the party line (for example, line subscriber No. 3 rings line subscriber No. 5).* In the manner previously described under A4, subscriber No. 3 busies the line and makes the central connecting circuit inaccessible to calls from the telephone exchange, whilst the party line is connected to the inlet of the telephone exchange associated with subscriber No. 3. The subscriber now dials the number of subscriber No. 5, for example No. 405.

In the central connecting circuit, the counting circuit VR has been disconnected from its voltage source by a contact of relay DK. When the line subscriber dials the first digit, hence the digit 4, the signal *a* is first received, causing energisation of relay P and thus energisation of relay Z. The energisation of relay Z in turn causes energisation of relay L and counting circuits TI and TIS to be made ready for counting.

The counting circuit TI counts the number of pulses of each pulse series, the counting circuit TIS counting the number of pulse series. If the subscribers have the telephone numbers 401, 402, 403, . . . 400, the first inlet of the pyramid V is connected to the fourth outlet of the pyramid IV, the second outlet of pyramid V is connected to the tenth outlet (which corresponds to the digit 0) of the pyramid IV, and the third outlet is connected via a make contact of relay Z to a relay winding TT. It will be evident that this system may be extended for telephone numbers having any arbitrary number of digits. After the digit 4 has been dialled, relay EL is energized, thus preventing release of relay Z, since this relay acquires a new energization circuit via a contact of relay EL. A break contact of relay EL resets the counting circuit TI to the zero position. With the second series of pulses, the relay P is first energized, causing de-energization of relay EL and counting circuit TI to be made ready again for counting the pulses of a pulse series. If the second digit dialled is a zero, then at the end of the second series of pulses the relay EL is again energised due to the second outlet of the pyramid V being connected to the tenth outlet (corresponding to the digit 0) of the pyramid IV. The release of relay Z is again prevented. At the end of the last series of pulses, the fact of relay Z still being energised causes energisation of the relay TT. If, with one of the previous series of pulses, a digit were dialled which is not in conformity with a connection between the pyramids IV and V, then relay EL cannot be energised at the end of this series of pulses, thus causing de-energisation of relay Z. The counting circuits TI and TIS cannot count further. The system above described for detecting the fact whether or not the telephone number of a subscriber of the party line has been dialled may be extended for any arbitrary number of digits per telephone number.

If the subscriber of the party line has dialled a telephone number of another subscriber of the party line, the busying circuit BS at the end of the last series of pulses is again made accessible to calls from the telephone exchange by means of a contact of relay TT. The relay TT also resets the counting circuits TI and TIS to their rest positions, whereupon the said relay is de-energised with retardation. During this time, the call from the exchange is received, thus causing energisation of the relays C5 and C. The relay C prevents de-energisation of relay TT.

The line subscriber No. 5 is rung in the manner previously described. When subscriber No. 5 lifts his receiver, relay P is again energised due to the called individual connecting circuit transiently transmitting signal *a*. Due to relay TT being energised, the relay M is energised, which relay remains energised via a contact of its own. When the relay P is released and relay M is energised, the relya CT is energised, whilst a contact of relay M causes the line wires of the outlet relating to the party line to be connected together. For the telephone exchange this implies the answering of the call. The energisation of relay CT also causes an alternating current on speech level to be led to the inlet of the telephone exchange. If the incoming call originates from the calling subscriber No. 3, this pilot signal is set up via the outlet of the exchange across resistor $R_1$. The pilot signal used is preferably the signal *a*, since in this case a particular detector for this signal is not required. The detector for the signal *a* is therefore connected via contacts of relay CT to the ends of resistor $R_1$. The opening of another contact of relay CT causes relay TT to be de-energised with retardation. If the pilot signal is received while the relay TT is still energised, relay P is energised and, due to relay TT still being energised, the relay N is also energised. The energisation of relay N causes release of relay DK. The exchange ascertains this as opening of the subscribers' loop and thus reacts by breaking-up the speaking path built up therein. However, the connecting circuit remains in a busy position so that calls from the telephone exchange cannot be received while the subscribers talk to each other.

If the pilot signal were not returned through the outlet of the telephone exchange, the relay P would not have been energised either. Due to the release of relay TT and the fact of relay P not being energised, a relay F is energised. The relay F brings the central connecting circuit to the normal condition except the busying circuit BS, whilst also the line wires of the outlet of the exchange remain connected together via a contact of relay F so that the exchange is not released. During the time that relay F is energised, but relay BL is not yet released, the generator of signal C is energised. Immediately thereafter, a relay W is energised via a ringing circuit WS which is now also energised. Subsequently, relay E is energised so that subscriber No. 5 receives the identificaton signal $B_1$. The called subscriber is now answered in the manner above described.

Figure 12:
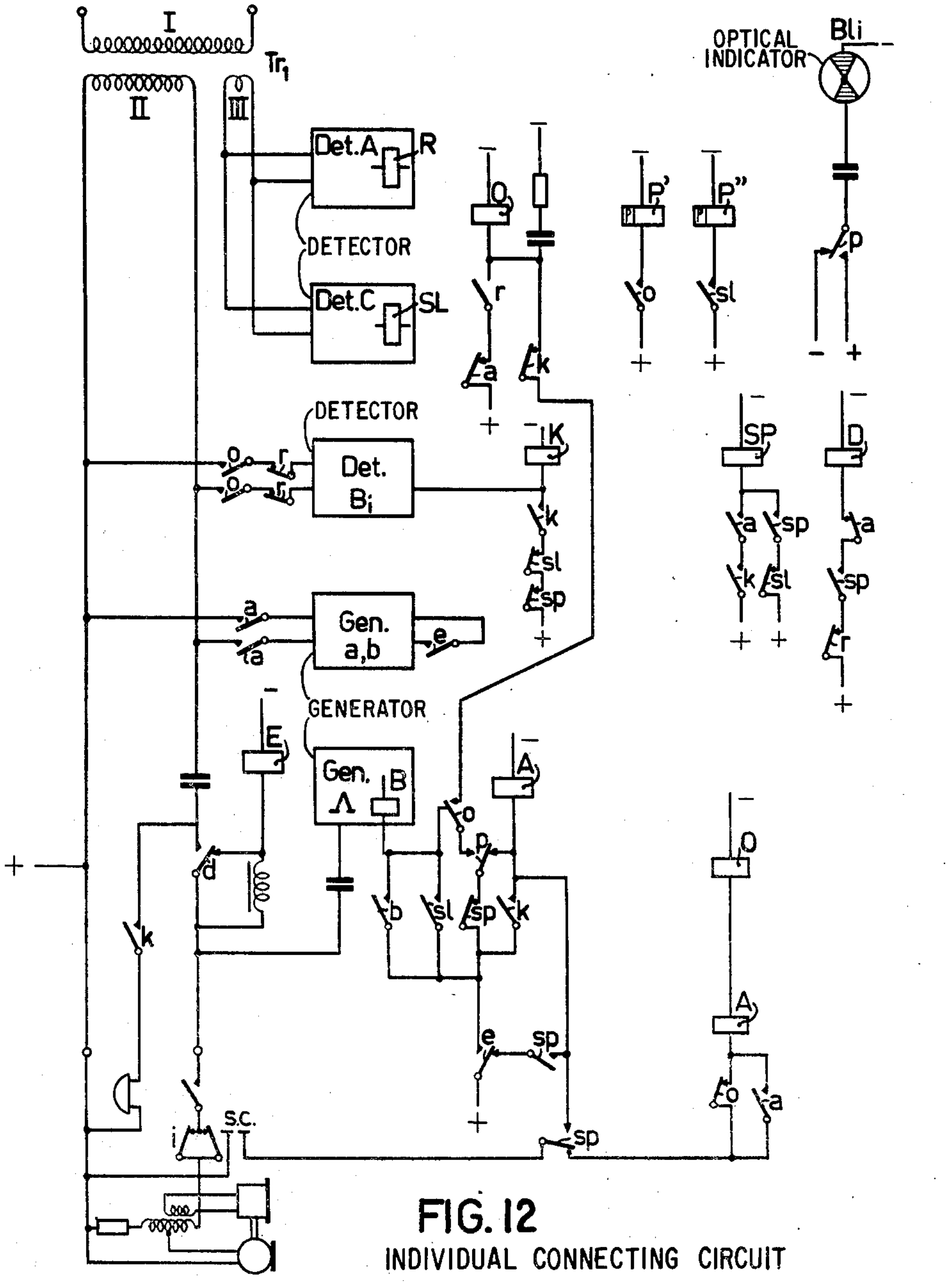
FIG. 12 shows a circuit for the individual connecting circuits.

FIG. 12 shows an example of a circuit of an individual connecting circuit.

*B1—Call from the central connecting circuit.*—The central connecting circuit applies alternating current of 80 volts and 50 c./s. to the line for about 0.5 sec., thus causing energisation of relay R in the detector for signal A in the individual connecting circuit. The energisation of relay R causes energisation of relay O and this in turn causes energisation of relay P′. Consequently, the individual connecting circuit is brought to the blocked position VIII, whilst also an indicator B1*i* is energised and thus gives an optical signal. When the alternating current signal of 50 c./s. ceases, relay R is released, but the relays O and P′ remain energised. Consequently, due to the release of relay R, the detector for the signal B*i* is connected to the party line. Due to the detection of this signal, relay K is energised and remains energised via a holding contact. By means of another contact of relay K, the ringer is connected to the party line so that the called subscriber can be rung. When this subscriber lifts his receiver, relay E′ is energised, causing also energisation of relay A′. The energisation of relay A′ causes energisation of a relay SP. The last-mentioned relay interrupts the circuit for energising the relay K, so that this relay is released, whereupon relay A′ is also released. During the time that relay A′ was energised, the generator for the signals *a* and *b* was connected to the party line. Since during this time the relay E′ was energised, this generator transmits the signal *a*. The central connecting circuit reacts to this signal by stopping the ringing signal W. The release of relay A′ also results in energisation of relay G, so that the receiver is connected to the party line and the conversation can start.

*B2—Call made by a subscriber of the party line.*—When the subscriber lifts his receiver while his individual connecting circuit is in the normal position, relay E′ is energised, thus causing energisation of relay A′. This results in the generator for the signals *a* and *b* transmitting the signal *a*. The central connecting circuit reacts to this signal by sending back the alternating current signal of 50 c./s. However, the calling subscriber is not blocked thereby, since relay O cannot be energised. The calling subscriber can now dial his pre-digit (for example, 3). During the turning of the dial, relay O is energised, thus causing the polar relay P′ to be switched over. However, relay A remains energised via a second winding in series with a second winding of relay O. During the return of the dial, relay E′ is de-energised as many times as pulses must be given (hence 3*x* in the example chosen). Consequently, in the generator for the signals *a* and b, the signal *a* is replaced three times by the signal *b*. After the end of the series of pulses, the retarded relay A′ is de-energised, whereas relay O remains energised. The calling subscriber cannot dial further in this condition of his individual connecting circuit.

When the calling subscriber has dialled the correct pre-digit, he receives the identification signal $B_1$ from the central connecting circuit (relay O is energised). Consequently relay K is energised. During the short time that the two relays K and A′ are energized, the generator for the signals *a* and *b* transmits the signal *a*. The individual connecting circuit thereafter occupies the position of outgoing calls.

*B3—Termination of the call by the line subscriber.*—When the line subscriber replaces his receiver, relay E′ is de-energised. However, this causes energisation of relay A′, resulting in the generator for the signals *a* and *b* being connected to the party line and transmitting the signal *b*. The central connecting circuit responds thereto by transmitting the signal C. Due to the detection of this signal, relay SL is energised, thus causing a counter winding P″ of relay P′ to be energised and hence this relay to be released. The energisation of relay SL also results in relay SP being released and this, in turn, causes the release of relay A′. The individual connecting circuit has now assumed the normal position.

*B4—Termination of the conversation by the subscriber of the exchange.*—The individual connecting circuit in this case receives the release signal C, this causing energisation of relay SL. The relay SL now causes the release of relay SP and the latter causes the release of relay D. The connection between the receiver and the party line is thus interrupted. By means of another contact of relay SL, the polar relay P′ is switched back and the optical indicator B1*i* de-energised. Via contacts of the relays E′ and SL, the generator for the signal Λ has been energised, so that subscriber hears the busy signal Λ in his microphone. The generator for the signal Λ includes a relay B′ having a holding contact *b*′ which holds the generator in the energised condition. Relay B′ is de-energised and hence the busy tone Λ ceases only by replacement of the receiver and hence de-energisation of relay E′.

What is claimed is:

1. A telephone system comprising a telephone exchange, a central connecting circuit, a plurality of subscribers stations, and means connecting said telephone exchange to all of said subscribers stations by way of said central connecting circuit, each of said subscribers stations comprising a handset and a switch mechanically coupled thereto responsive to the lifting of said handset from a given position and the returning of said handset to said given position by an operator, said central connecting circuit comprising a source of a central busy signal, a source of a separate central identification signal corresponding to each subscribers station connected thereto, a source of a central ringing signal, and a source of a central release signal, each of said subscribers stations comprising a source of an individual busy signal, a source of an individual release signal, a source of telephone number signals, and means for generating first signals to an operation indicating that the respective subscribers station is being called, each of said subscribers stations further comprising means responsive to the lifting of the respective handset for transmitting said individual busy signal to the central connecting circuit only when the handsets of the other subscribers stations are in said given position and the respective subscribers station is not being called, means responsive to the receipt of a central busy signal for sending the respective individual identification signal to said central connecting circuit only when the respective handset is lifted from said first position, means responsive only to the receipt of the central identifying signal corresponding to the subscribers station for permitting the transmission of said telephone number signals to said central connecting circuit, means responsive to the receipt of said central ringing signal for generating said first signal only subsequent to the receipt of a central identifying signal corresponding to the respective subscribers station, means for transmitting said individual release signal to said central connecting circuit when said handset is returned to said given position, said central connecting circuit comprising means responsive to said individual busy signal for generating said central busy signal, means responsive to said individual signal for generating said central release signal, means responsive to the receipt of an individual identification signal and to receipt of signals from said exchange for generating said central identification signal and means responsive to signals from said exchange for generating said central ringing signal.

2. A telephone system comprising an automatic telephone exchange, a central connecting circuit, a plurality of subscribers stations, and means connecting said exchange to all of said subscribers stations by way of said central connecting circuit, each of said subscribers stations comprising a handset and a switch mechanically coupled thereto responsive to the lifting of said handset from a given position and the returning of said handset to said given position, said exchange comprising means for selectively transmitting to said central connecting circuit a separate exchange signal corresponding to each of said subscribers stations, said central connecting circuit comprising means for selectively generating and transmitting to said subscribers stations a central busy signal, a central release signal, a central ringing signal, and a separate central identification signal corresponding to each of said subscribers stations, each of said subscribers stations comprising means for generating an individual busy signal, an individual release signal, an individual identification signal corresponding to the respective subscribers station, telephone number signals, and acoustic signals for indicating that the respective subscribers station is being called, said central connecting circuit comprising means for transmitting said central busy signal to all of said subscribers stations in response to said exchange signal and said individual busy signal, means for transmitting said central identification signals to all of said subscribers stations in response to receipt of said individual identification signal from the subscribers station corresponding thereto and in response to said exchange signal subsequent the transmission of said central busy signal, means for transmitting said central ringing signal subsequent the transmission of said central identification signal and central busy signal, means for transmitting said central release signal in response to said individual release signal and also following the cessation of said exchange signal, and means for connecting said subscribers stations to said exchange in response to said telephone number signals, each of said subscribers stations comprising means for generating said individual busy signal in response to said lifting of said handset only when the handsets of all other subscribers stations are in said given position and when a central ringing signal is received thereby, means responsive to the receipt of a central busy signal for sending the respective individual idendification signal to the central connecting circuit when the respective handset is lifted from said given position, means for generating said acoustic signal in response to receipt of said central ringing signal only subsequent to receipt of a central identification signal corresponding to the respective subscribers station, means responsive only to the receipt of the central identifying signal corresponding to the subscribers station for permitting the transmission of said telephone number signals to said central connecting circuit, and means for transmitting said individual release signal to said central connecting circuit when said handset is returned to said given position.

3. A telephone system comprising an automatic telephone exchange, a central connecting circuit, a plurality of subscribers stations, and means connecting said exchange to all of said subscribers stations by way of said central connecting circuit, each of said subscribers stations comprising a subscribers set and an individual connecting circuit, each of said subscribers sets comprising a handset and a switch mechanically coupled thereto for generating a first signal when the handset is lifted from a given position and a second signal when said handset is returned to said first position and an acoustic signal, each of said individual connecting circuits comprising means for generating an individual busy signal, an individual release signal, an individual identification signal corresponding to the respective subscribers station, telephone number signals, and an individual ringing signal, said exchange comprising means for selectively transmitting to said central connecting circuit a separate exchange signal corresponding to each of said subscribers stations, said central connecting circuit comprising means for generating and transmitting to said subscribers stations a central body signal in response to said exchange signal and in response to said individual busy signal, means for generating and transmitting to said subscribers stations a central identification signal corresponding only to a single subscribers station in response to the receipt of an individual identification signal from the station corresponding thereto and in response to an exchange signal subsequent the transmission of said central busy signal, means for generating and transmitting to said subscribers stations a central ringing signal subsequent the transmission of said central busy signal and central identification signal, means for generating and transmitting to said subscribers stations a central release signal in response to receipt of an individual release signal and in response to the cessation of said exchange signal, and means for connecting said subscribers stations to said exchange in response to the receipt of a telephone number signal, each of said subscribers stations comprising means for transmitting said individual busy signal to said central connecting circuit in response to said first signal only when the handsets to all other subscribers stations are in said given position and when a central ringing signal is received thereby, means for transmitting said individual release signal to said central connecting circuit in response to said second signal, means for transmitting said individual identification signal to said central connecting circuit in response to the receipt of a central busy signal when the respective handset is lifted from said given position, means for transmitting said individual ringing signal to the respective subscribers set in response to receipt of a central ringing signal, and means responsive only to the receipt of the central identification signal corresponding to the subscribers station for permitting the transmission of said telephone number signals to said central connecting circuit.

4. The telephone system of claim 3 wherein said individual connecting circuits comprise a source of third signals, and means responsive to the sequential receipt of said central busy signal and said first signal for transmitting said third signal to the respective subscribers set, said subscribers set comprising a source of acoustic busy signals, and means responsive to said third signal for energizing said source of acoustic busy signals.

5. The telephone system of claim 3 wherein each said subscribers set comprises means for generating third signals corresponding to the number of a subscribers set to be called, said individual connecting circuits comprising means responsive to said third signals following the receipt of said central identification signal for transmitting said telephone number signals to said central connecting circuit.

6. The telephone system of claim 3 wherein said individual connecting circuit comprises means responsive to said central busy signal and the subsequent passage of a predetermined time without receipt of a first signal or central identification signal corresponding to the respective subscribers station for making said subscribers station insensitive to all signals but said central release signal, said central busy signal, and said first signal.

7. The telephone system of claim 3 wherein said individual connecting circuit comprises means responsive to the successive receipt of said central busy signal, said first signal, said central busy signal and the passage of a predetermined time for generating a third signal, and said subscribers set comprises means responsive to said third signal for generating an acoustic busy signal.

References Cited by the Examiner

UNITED STATES PATENTS 2,872,518 2/59 Trousdale ____________ 179—17

ROBERT H. ROSE, *Primary Examiner.*

WILLIAM C. COOPER, THOMAS B. HABECKER, *Examiners.*